United States Patent
Hsiang Lin

(10) Patent No.: US 8,486,252 B2
(45) Date of Patent: Jul. 16, 2013

(54) COPPER CHLORIDE/COPPER BROMIDE DISINFECTOR FOR SWIMMING POOLS AND CONTROL METHOD THEREOF

(75) Inventor: Hua Hsiang Lin, Xiamen (CN)

(73) Assignee: Intex Recreation Corp., Long Beach, CA (US)

( * ) Notice: Subject to any disclaimer, the term of this patent is extended or adjusted under 35 U.S.C. 154(b) by 159 days.

(21) Appl. No.: 12/871,636

(22) Filed: Aug. 30, 2010

(65) Prior Publication Data

US 2011/0073488 A1    Mar. 31, 2011

(30) Foreign Application Priority Data

Aug. 28, 2009    (CN) .......................... 2009 1 0112444

(51) Int. Cl.
*C02F 1/461*    (2006.01)

(52) U.S. Cl.
USPC ........... 205/701; 205/742; 205/760; 204/267; 204/230.2

(58) Field of Classification Search
USPC ............... 205/701, 742, 760; 204/267, 230.2
See application file for complete search history.

(56) References Cited

U.S. PATENT DOCUMENTS

| | | | | |
|---|---|---|---|---|
| 3,305,472 A | * | 2/1967 | Oldershaw et al. | 204/268 |
| 6,508,929 B1 | * | 1/2003 | Mercer | 205/701 |
| 2007/0175833 A1 | * | 8/2007 | Ikeboh et al. | 210/748 |

* cited by examiner

*Primary Examiner* — Arun S Phasge
(74) *Attorney, Agent, or Firm* — Faegre Baker Daniels LLP

(57) ABSTRACT

A two-in-one copper chloride/copper bromide disinfector and a method of controlling the same. In operation, when copper is released, the positive and negative electrodes of a copper billet are periodically reversed, while the positive and negative electrodes of a titanium plate/graphite polar plate are in an uncharged state. When chlorine/bromine is released, the positive and negative electrodes of a titanium plate/graphite polar plate are periodically reversed, while the positive and negative electrodes of the copper billet are short-connected, then connected to the negative electrode of the titanium plate/graphite polar plate, or applied thereon with an electric voltage that is lower than the electric voltage of the negative electrode of the titanium plate/graphite polar plate. With this method, the copper billet out of operation is shorted-connected to the negative electrode of the titanium plate/graphite polar plate or connected to an electric voltage that is lower than that of the negative electrode. Thus the release amount of copper ions is controllable, the volume of the disinfector is reduced, and the corrosion between the positive and negative electrodes of the copper billet is uniform.

18 Claims, 10 Drawing Sheets

FIG_7

COPPER CHLORIDE/COPPER BROMIDE DISINFECTOR FOR SWIMMING POOLS AND CONTROL METHOD THEREOF

RELATED APPLICATION

This application claims priority from Chinese Patent Application No. 200910112444.3, filed on Aug. 28, 2009, the disclosure of which is hereby incorporated by reference herein.

BACKGROUND OF THE DISCLOSURE

1. Field of the Invention

The present disclosure relates to a compound disinfector. In particular, the present disclosure relates to a two-in-one disinfector system which may control the amount of copper ions released into water (e.g., pool water), and a method for control the same.

2. Description of the Related Art

To improve the quality of water in swimming pools, and in particular, saltwater swimming pools, disinfectors such as a copper chloride disinfector are known in the art. Known copper chloride disinfectors often comprise a main pipeline 10, a sodium hypochlorite generating device 30 and a copper ions generating device 40 (as shown in FIG. 1). Main pipeline 10 is mounted on the circulation pipeline of the swimming pool. The sodium hypochlorite generating device 30 is set in the midstream of the main pipeline 10, and includes an anode and a cathode, the electrodes using a titanium plate 301 for generating chlorine. Copper ions generating device 40 is set downstream of the main pipeline 10 and hypochlorite generating device 30, and also includes an anode and a cathode, both electrodes using copper billets 401 for generating copper ions. In operation, the anodes and cathodes of both sodium hypochlorite generating device 30 and copper ions generating device 40 are supplied with direct current, so as to carry out an electrolysis reaction. When passing through the sodium hypochlorite generating device 30, sodium chloride (NaCl) in the pool water generates halogens, such as chlorine ($Cl_2$) or bromine by electrolysis, which quickly dissolves into water and generates hypochloric acid (HClO) and hypochlorite ($ClO^-$), which may destroy somatic cell wall, cell membrane, and even further penetrate through the cell membrane to destroy DNA of water pollutants such as algea, thus achieving the function of sterilization. However, this process alone may leave somatic enzymes in the pool water. Accordingly, the pool water continues to flow into the copper ions generating device 40. At this time, the anode copper billet 401 loses electrons so as to become copper ions, which are uniformly released into water. The copper ions combine with sulfhydryl groups of somatic enzymes so the enzymes lose activity, and effectively form algaecide which may suppress the growth of algae, thus achieving the function of effective sterilization and disinfection of pool water.

However, in practice, the amount of copper ions released into the water when using known copper chloride disinfectors is not easily controllable, which leads to a high content of copper ions in the pool water. This high content of copper ions has negative effects. For example, the excess copper ions react with hydroxyl ions in the water, generating green copper hydroxide particles, thus causing the color of the pool water to become green. When a swimmer comes ashore from the swimming pool after swimming, the copper hydroxide particles adhere to human hair and turn the hair a green color, thus disadvantageously affecting the practicability of the swimming pool.

Known copper chloride disinfectors result in non-uniform corrosion of copper billet 401, in which the end face of the copper billet 401 closest to titanium plate 301 is more corroded than the rest of the end face. To avoid such a situation, one known method is to increase the distance between copper billet 401 and titanium plate 301 as far as possible. However, due to the size of the operational environment of known disinfectors, it is not possible that such disinfectors be indefinitely large. Moreover, a large distance between the copper billet and a titanium plate in a disinfector may result in the release of more copper ions than is desired, as more fully explained below.

When the prior art copper chloride disinfector is in operation, titanium plate 301 is continuously supplied with electric power, while copper billet 401 is intermittently supplied with electric power. The specific working process is as follows: assuming that the customer sets the time consumed for the work of disinfection is n hours (n is a positive integer) per day, then it takes n hours per day to generate chlorine by the disinfector, meanwhile with a long period of 1 hour, copper is generated intermittently in a manner of constant electric current. In each long period, the first 20 minutes is consumed for supplying the copper billet 401 with a constant electric current, and the remaining 40 minutes is for cutting off the electric power. Within each first 20 minutes, every 4 minutes is adopted as a short period. In each 4 minutes, the first 117 seconds is consumed for supplying the copper billet 401 with a constant electric current 175 mA, then after the elapse of 3 seconds for cutting off the electric power, the copper billet 401 is continued to be supplied with a constant electric current −175 mA (reversed), then another 3 seconds for cutting off the electric power, which goes round and round repeatedly until the working time of the first 20 minutes per hour is met.

With reference to FIG. 2 (herein 3 pieces of titanium plate A, B, C arranged from top to bottom are taken as an example, and the copper billets numbered D and E in the order from top to bottom), when the copper billets are cut off from the supply of electric power while the positive and negative electrodes of the titanium plate are supplied with electric power, that is, the salt water is electrolyzed while the copper billets are out of operation, the 3 pieces of titanium plates A, B, C may generate an electric current loop with respect to the copper billets D and E, with an electric potentials thereof in the order from the highest to the lowest being on the titanium plate A, the copper billet D, the copper billet E, and the titanium plate C (one embodiment is as follows: A=9.89V, D=4.77V, E=4.19V, C=0V). This hierarchy in electric potentials can have the following effects: (i) the electric potential from copper billet D to copper billet E may cause copper billet D to release copper ions; (ii) the electric potential from copper billet D to titanium plate C may cause copper billet D release copper ions; and (iii) the electric potential from copper billet E to titanium plate C may cause copper billet E release copper ions. This leads to the ultrahigh concentration of copper ions in the water pool.

While the copper billets are supplied with electric power and in the meantime the positive and negative electrodes of the titanium plates are also supplied with electric power, that is, the salt water is electrolyzed while the copper billets are simultaneously in operation, the schematic drawing is the same as FIG. 2 (the electric potential of the copper billet D is higher than that of the copper billet E). This hierarchy in electric potentials can have the following effects: (i) the electric potential from copper billet D to copper billet E may cause copper billet D release copper ions; (ii) the electric potential from copper billet D to titanium plate C may cause copper billet D release copper ions; and (iii) the electric potential from copper billet E to titanium plate C may cause copper billet E release copper ions. Release of copper ions as described in (ii) and (iii) above are the releases that lead to the ultrahigh concentration of copper ions in the water pool.

With reference to FIG. 3, when the electric potential of the copper billet D is lower than that of the copper billet E, the electric potentials thereof in the order from the highest to the lowest are on titanium plate A, copper billet E, copper billet D, and titanium plate C. As with the drawing in FIG. 2, this hierarchy in electric potentials can have the following effects: (i) the electric potential from copper billet E to copper billet D may cause copper billet E to release copper ions; (ii) the electric potential from copper billet E to titanium plate C may cause copper billet E to release copper ions; and (iii) the electric potential from copper billet D to titanium plate C may cause copper billet D to release copper ions. Release of copper ions as described in (ii) and (iii) in this paragraph are the releases that lead to the ultrahigh concentration of copper ions in the water pool.

The above mentioned prior art design presents challenges for effectively controlling the release of copper ions due to the lack of constant current, thus causing a harmful release of copper ions. Moreover, such a harmful release causes the dissolution and corrosion of the end face of the copper billet closest to the titanium plate to be worse than the dissolutions and/or corrosion of the rest of the end face of the copper billet. Accordingly, the present disclosure aims to control the content of copper ions in the disinfector.

SUMMARY OF THE DISCLOSURE

The present disclosure relates to a two-in-one copper chloride/copper bromide disinfector for the swimming pool and the control method thereof, with which the release amount of copper ions is controllable, the volume of the disinfector is reduced, and the corrosion between the positive and negative electrodes of the copper billet is uniform.

According to one aspect of the present disclosure, a swimming pool disinfector is provided that includes a pool water pipeline having an inlet and outlet through which pool water passes to create an electrolysis bath area; a plurality of sanitizer electrodes including at least one positive electrode and at least one negative electrode positioned in the electrolysis bath area to create sanitizing halogens; a plurality of copper electrodes including at least one positive electrode and at least one negative electrode positioned in the electrolysis bath to create copper ions; a power source providing electrical current to the plurality of sanitizer electrodes and the plurality of copper electrodes; and a controller controlling the flow of electrical current to the plurality of sanitizer electrodes and the plurality of copper electrodes. The controller provides periodically reversing electrical current to the sanitizer electrodes of electrodes while short-connecting the positive and negative electrodes of the copper electrodes.

According to another aspect of the present invention, a method is provided for controlling the release of copper ions from a disinfector having a plurality of sanitizer electrodes generating halogen ions and a plurality of copper electrodes generating cooper ions. The method includes the steps of: a) supplying electric current to the sanitizer electrodes in order to release halogen ions, and during the release of halogen ions: (i) periodically reversing the electrical polarity of the sanitizer electrodes; (ii) short-connecting the copper electrodes, and (iii) creating an electrical potential in the cooper electrodes of less than or equal to the electrical potential of at least one negative electrode of the sanitizer electrodes; b) supplying an electric current to the copper electrodes to release copper ions, and during the release of copper ions: (i) periodically reversing the electrical polarity of the copper electrodes while the electrodes of the sanitizer electrodes are placed in a an uncharged state.

BRIEF DESCRIPTION OF THE DRAWINGS

The above mentioned and other features and objects of this disclosure, and the manner of attaining them, will become more apparent and the disclosure itself will be better understood by reference to the following description of embodiments taken in conjunction with the accompanying drawings, wherein.

Corresponding reference characters indicate corresponding parts throughout the several views.

DETAILED DESCRIPTION OF THE DISCLOSURE

The embodiments disclosed herein are not intended to be exhaustive or limit the disclosure to the precise forms disclosed in the following detailed description. Rather, the embodiments are chosen and described so that others skilled in the art may utilize their teachings.

Figure 6:
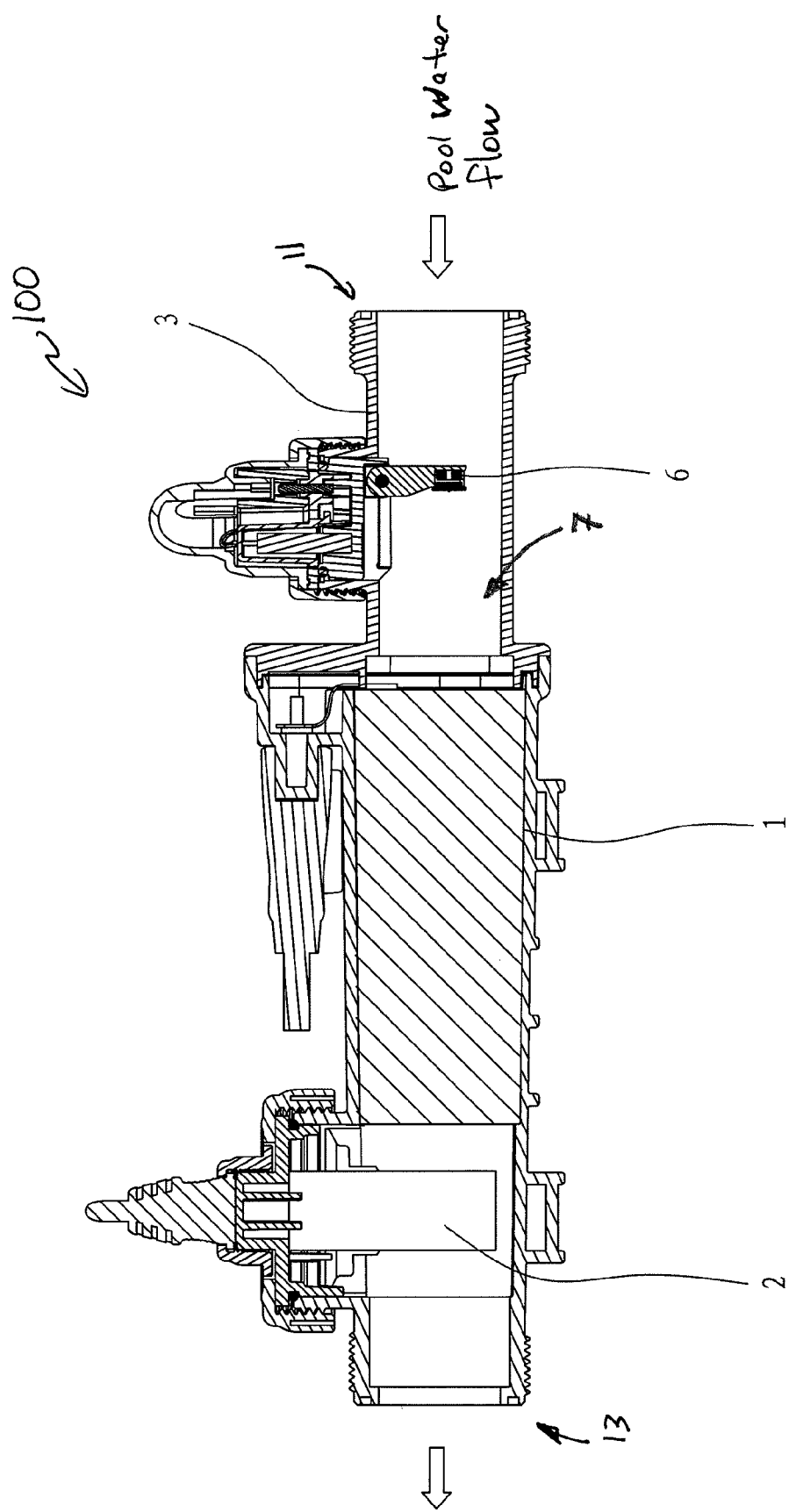
FIG. 6 is a structural illustration view of the present disclosure.

As shown in FIG. 6, disinfector 100 of the present disclosure uses a two-in-one copper chloride/copper bromide system and a method for controlling the same. Disinfector 100 includes electrodes 1 of either titanium plates (for a copper chloride disinfector) or graphite polar plates (for a copper bromide disinfector) (not shown) that generators halogens, such as chlorine or bromine, and a copper electrodes or billet 2. Through multiple phases of operation, the disinfector of the present disclosure controls the release of copper ions from copper billet 2. In one phase, titanium plate 1/graphite polar plate is supplied with electric power, and copper billet 2 is not supplied with electric power; however, during this phase, the two electrodes of copper billet 2 are either short-connected to the negative electrode of titanium plate 1/graphite polar plate or are placed at an electric voltage lower than the negative electrode. This configuration allows the electric potential of copper billet 2 to be equal to or less than that of the negative electrode of titanium plate 1/graphite polar plate, which, in turn, prevents copper ions from being generated. Thus, the disinfector of the present disclosure allows a user to control the release of copper ions, thereby assuring the desired quality of pool water. Furthermore, under the control of an electronic switch, a main control unit controller ("MCU") controls the supply of electric power to cause switching, or reversing of the positive and negative electrodes of the copper billet to occur at particular intervals, thereby allowing the two electrodes of copper billet 2 to uniformly release copper ions and achieve uniform corrosion. In addition, the distance between titanium plate/graphite polar plates 1 and copper billet 2 is relatively small, thus the size of the disinfector (and therefore the volume it displaces) may be effectively reduced.

With reference to FIG. 6, the present disclosure provides a control method of a two-in-one copper chloride disinfector applied to a swimming pool. When copper is released by the disinfector, copper billet 2 is supplied with a constant electric current, and the positive and negative electrodes of copper billet 2 are periodically reversed while the positive and negative electrodes of titanium plate 1 are in an uncharged state. When chlorine is released, titanium plate 1 is provided with an electrolysis electric voltage, and the positive and negative electrodes of titanium plate 1 are periodically reversed while the positive and negative electrodes of copper billet 2 are short-connected together, then connected to the negative electrode of titanium plate 1 or applied thereon with an electric voltage that is lower than the electric voltage of the negative electrode of titanium plate 1.

To control the amount of copper being electrolyzed, copper billet 2 may either be supplied with a constant electric current or provided with a saw-tooth wave or half sine wave electric current. The quantity of electric current is calculated relative to the amount of copper required to be electrolyzed. One example calculation includes sampling the electric current of copper billet 2 at equal intervals, taking the absolute value of the quantity of electricity in each interval, and summing the individual quantities of electricity to ensure the sum corresponds to the required dissolution of a certain amount of copper. As another example, the required time of the quantity of electricity corresponding to the dissolution of a certain amount of copper billet 2 is calculated in a form of the capacitive integration of the absolute value of the quantity of electricity flowing through copper billet 2.

Referring still to FIG. 6, an exemplary two-in-one copper chloride disinfector of the present disclosure comprises a salt water pipeline 3, an electrolysis bath 7 and an electric system (discussed below with reference to FIGS. 4-5). Titanium plates 1 coated with oxides of the platinum family and copper billets 2 are provided in electrolysis bath 7, and both the titanium plates 1 and copper billets 2 have a plurality of pairs of positive and negative electrodes. To reduce the size of the disinfector, and thus its volume, the distance between titanium plates 1 and copper billet 2 is from 5 mm to 400 mm, most preferably from 5 mm to 200 mm, and the electrolysis bath 7 further has a pipeline inlet 11 and a pipeline outlet 13. The salt water pipeline 3 has a sodium chloride solution therein, which enters through inlet 11 to electrolysis bath 7, flows past the surfaces of titanium plate 1 and copper billet 2, and then flows out through outlet 13 of pipeline 3. For salt water pools, the concentration of the salt water is from 1.0 g/L to 30 g/L, most preferably from 2.0 g/L to 4.0 g/L, and the temperature thereof is from preferably 10° C. to 40° C.

Figure 1:
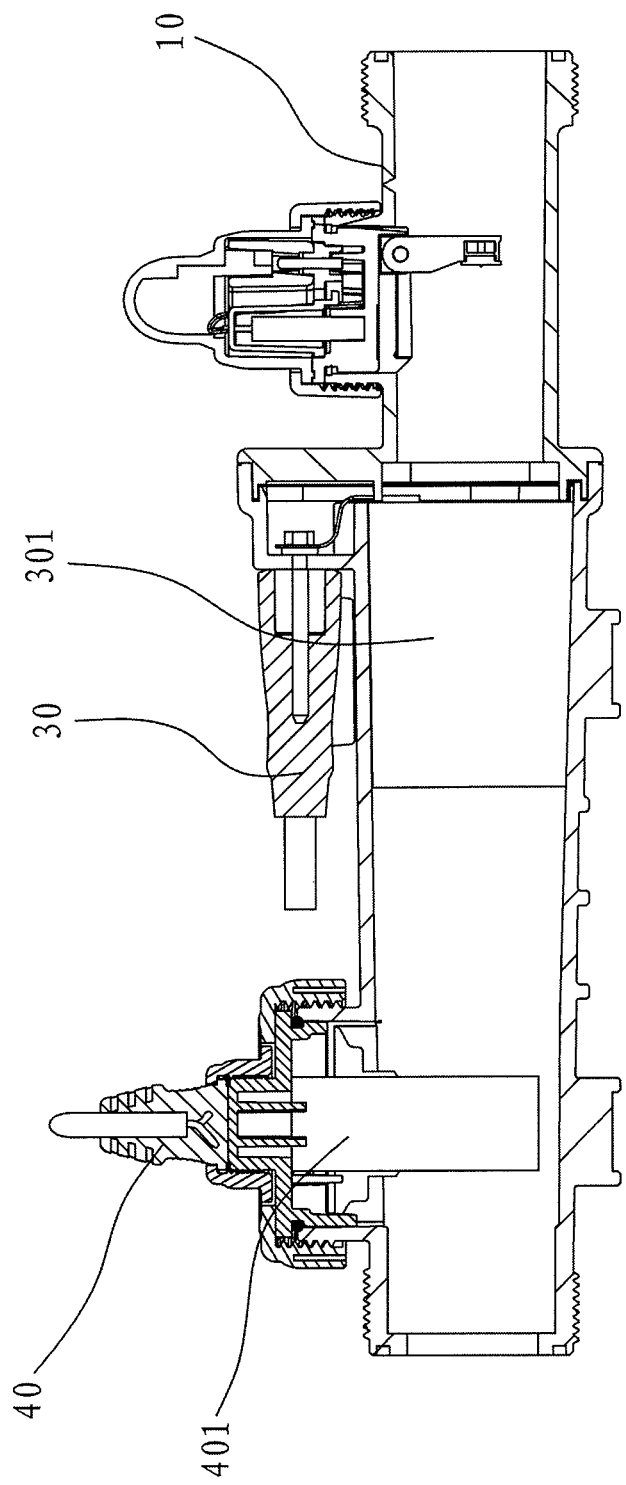
FIG. 1 is a structural illustration view of a prior art disinfector.
Figure 2:
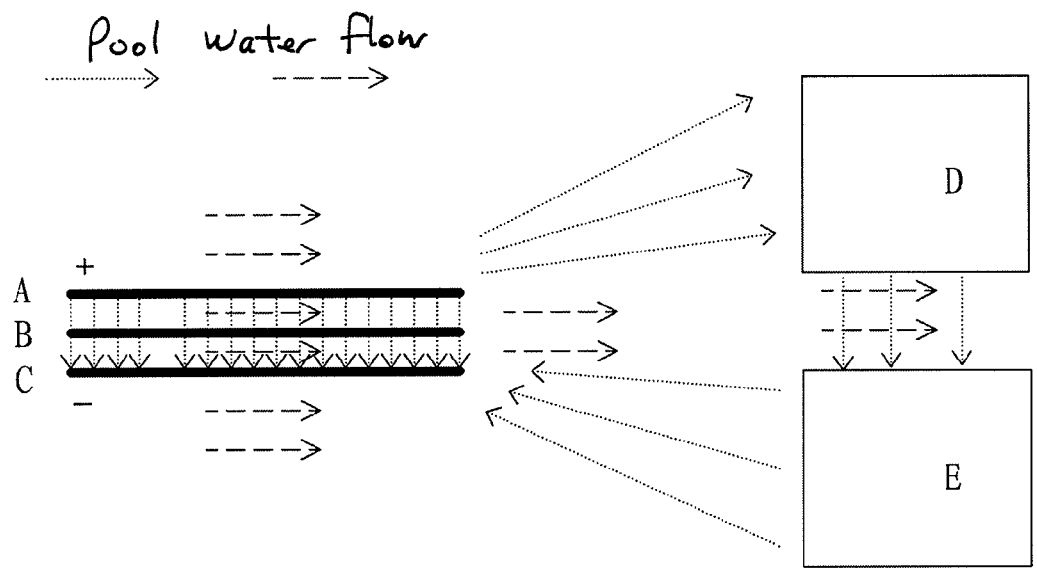
FIG. 2 is an illustration of the electric potential when the copper billet D and E are not supplied with electric power.
Figure 3:
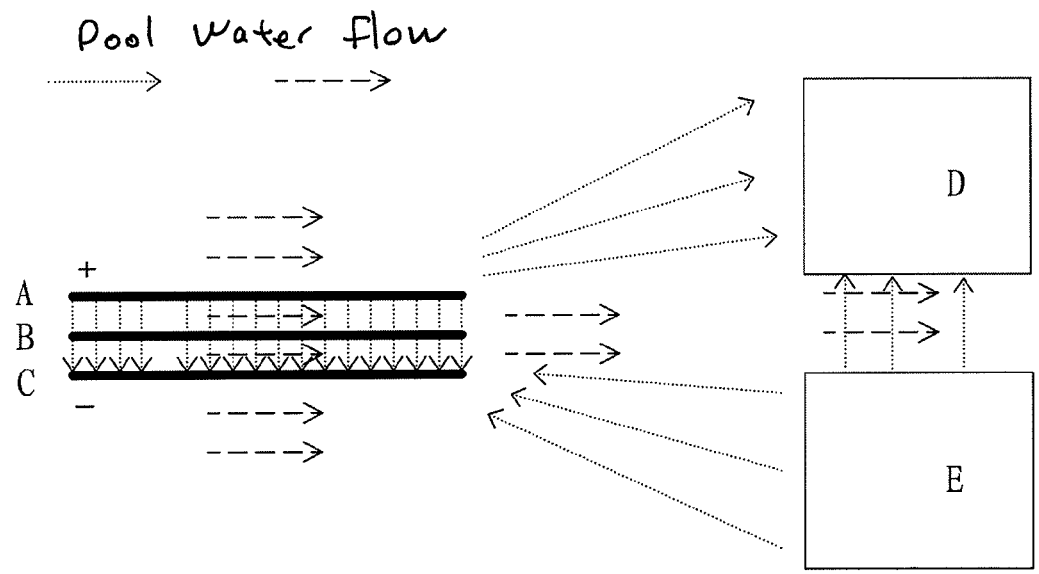
FIG. 3 is an illustration of the electric potential when the copper billet is supplied with electric power and the electric potential of copper billet D is lower than that of copper billet E.
Figure 4:
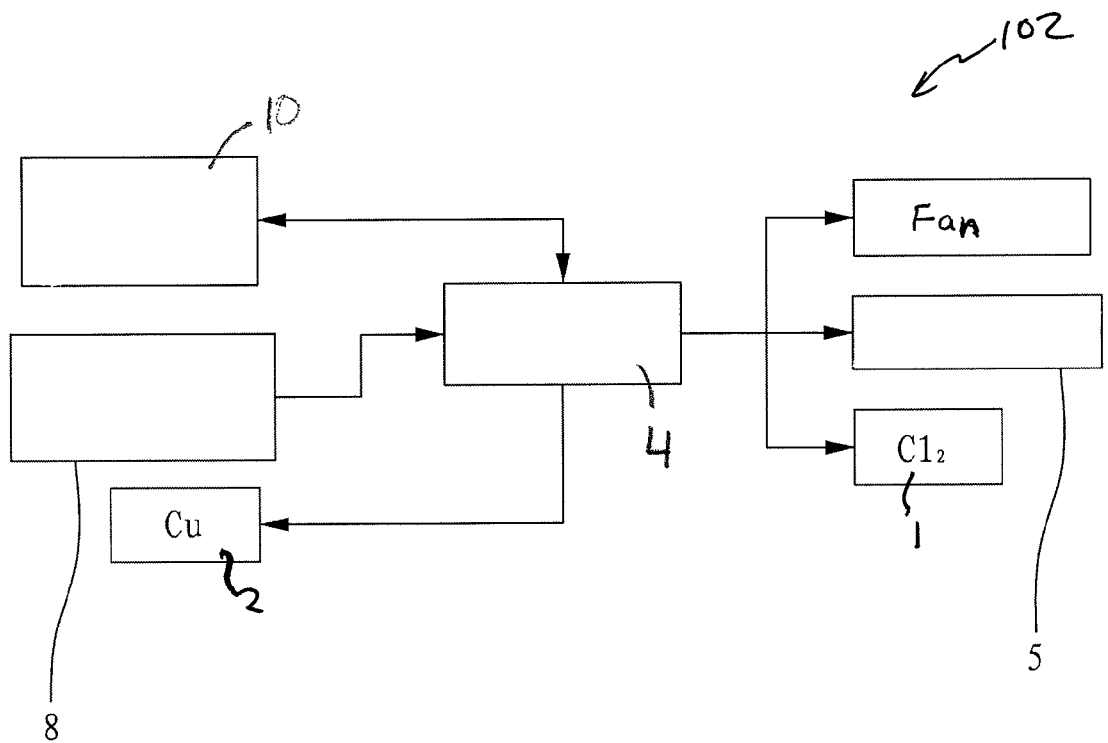
FIG. 4 is the general control diagram of the present disclosure.
Figure 5:
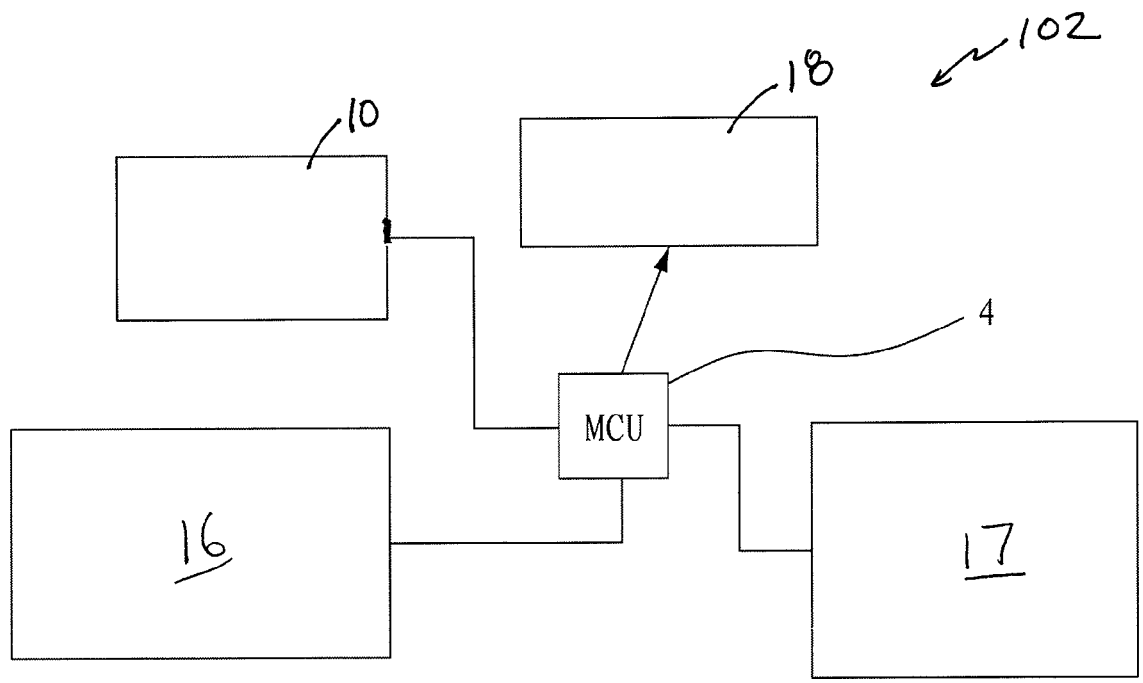
FIG. 5 is a magnified illustration view of the main control portion in FIG. 4.

As shown in FIGS. 4 and 5, an exemplary electric system 102 of the present disclosure mainly includes electrical power source 10, main control unit controller ("MCU") 4, and electronic switch 8. Switch 8 may be any known switch, including, for example, a relay, a MOS electronic device, or other switches. Electrical source 10 is connected to MCU 4, copper billet 2 and the electrodes of titanium plate 1 via switch 8. MCU 4 changes the polarity of the electric power as well as the quantity of electricity supplied to copper billet 2 and titanium plate 1 through a control on switch 8. In FIGS. 5 and 7-11, switch 8 is shown in two separate areas, chlorine/bromide control area 16 and copper control area 17.

With further reference to FIGS. 7-11, MCU 4 mainly achieves the control on the supply of electric power to the electrodes on titanium plate 1 and copper billet 2 through five relays: K1, K2, K3, K4, and K5. In addition, it is to be noted that, for ease of control, the positive electrodes of titanium plates 1 may be short-connected to one point, e.g., SALT+ in the figures, while the negative electrodes of titanium plates 1 may be short-connected to SALT−. In like manner, the positive electrodes of copper billets 2 may be short-connected to CU+, while the negative electrodes of copper billets 2 may be short-connected to CU−.

In a preferred embodiment, relay K3 is a single-pole single throw relay, which has two operational states: conducting (connected, that is, ON) and not conducting (disconnected, that is, OFF). The normal state of relay K3 is the disconnected (OFF) state, wherein one end is connected to the electrical source and the other end is connected to the normally open contact of relay K1 and the normally closed contact of relay K2.

In a preferred embodiment, relays K1, K2, K4, and K5 are single-pole double throw relays. In the "OFF" state (i.e., not conducting), the fixed ends are all lap-jointed to the normally closed contact, while in the "ON" state (i.e., conducting), the fixed ends are lap-jointed to the normally open contact. The connecting relationship is respectively as follows: the fixed end of relay K1 is connected to the negative electrode of titanium plate 1, the normally closed contact is grounded; the fixed end of relay K2 is connected to the positive electrode of the titanium plate 1, the normally open contact is grounded; the fixed end of relay K4 is connected to the negative electrode of copper billet 2, the normally closed contact is grounded or connected to an electric voltage that is lower than the ground potential (in this embodiment, it is grounded for example), the normally open contact is connected to the constant-current source; the fixed end of relay K5 is connected to the positive electrode of copper billet 2, the normally closed contact is connected to the normally closed contact of relay K4, and the normally open contact is connected to the constant-current source.

Figure 7:
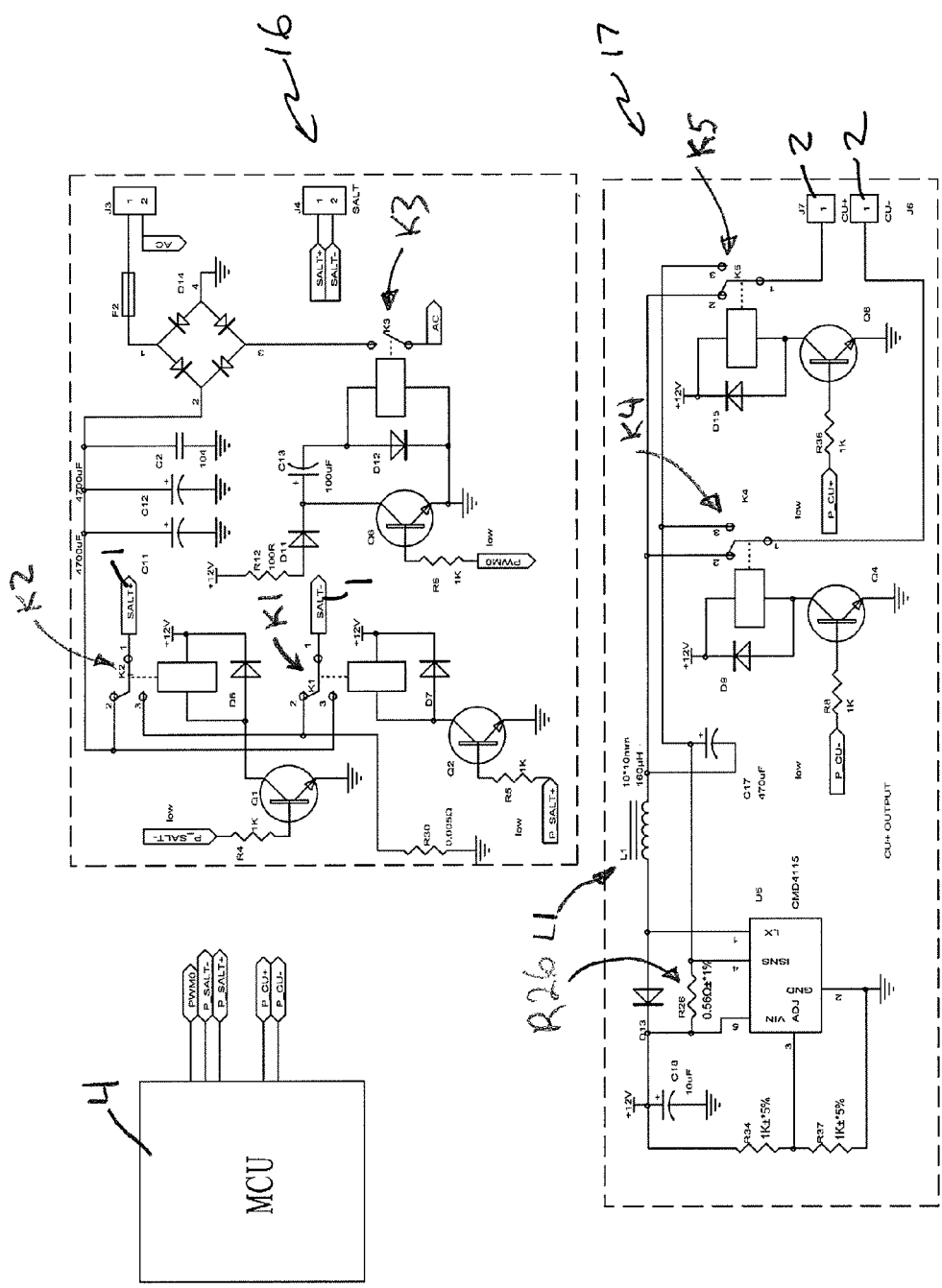
FIG. 7 is a circuit diagram when neither the copper billet nor the titanium plate are supplied with electric power.
Figure 12:
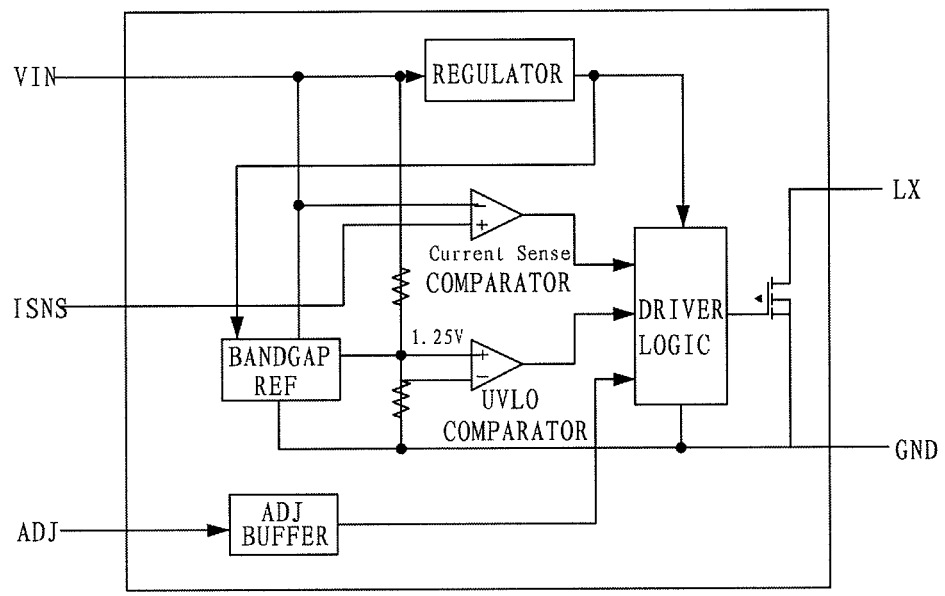
FIG. 12 is the internal block diagram of a chip used in the present disclosure.
Figure 13:
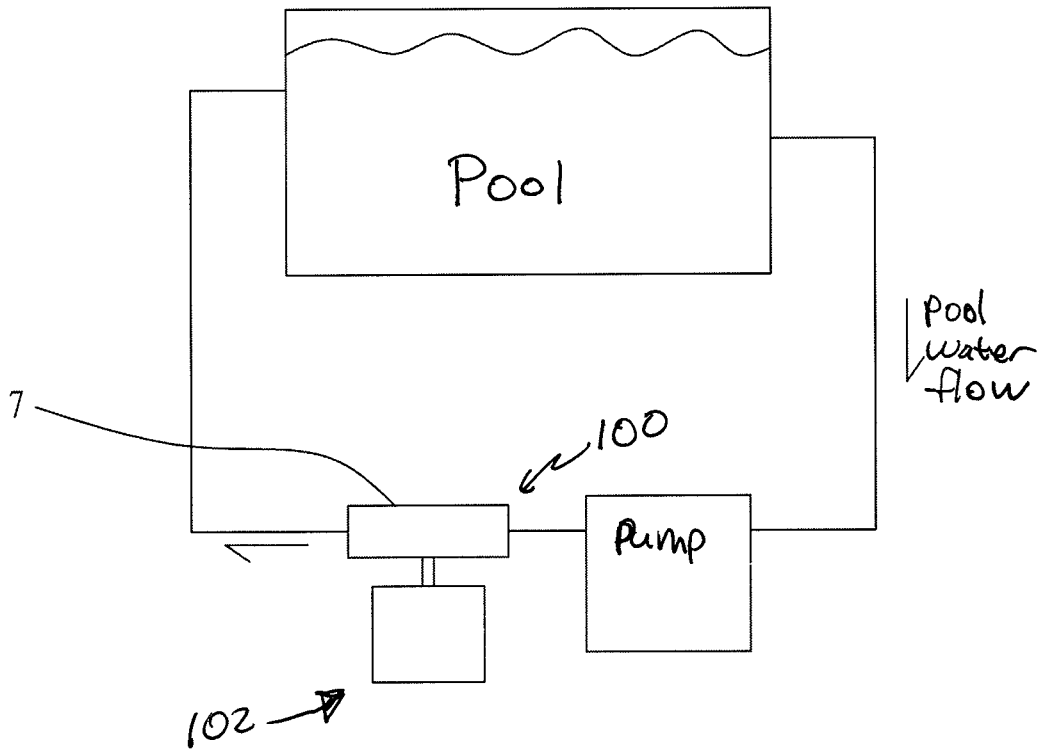
FIG. 13 is the overall configuration drawing of the present disclosure as applied to a swimming pool.

The disinfector of the present disclosure preferably has multiple operating states. Referring first to FIG. 7, a circuit connecting diagram for State 1 is shown. During State 1, neither titanium plate 1 nor copper billet 2 are supplied with electric power. Accordingly, relay K3 and relays K1, K2, K4, K5 are all in the off state. Titanium plate 1 is in the state of being cut off from the electric power, while the positive and negative electrodes of copper billet 2 are short-connected, being connected to the LX end of chip 15 (which is preferably a CMD4115 chip), via the inductance L1. With reference to FIG. 12, which is the internal connecting block diagram of chip 15, since the electric current flowing in the inductance L1 and resistor R26 during State 1 is 0, the CS comparator (Current Sense comparator) outputs a high electric level and the MOS is turned on, so that the LX end is pulled lower, to cause both electrodes of copper billet 2 to be in the grounded state.

Figure 8:
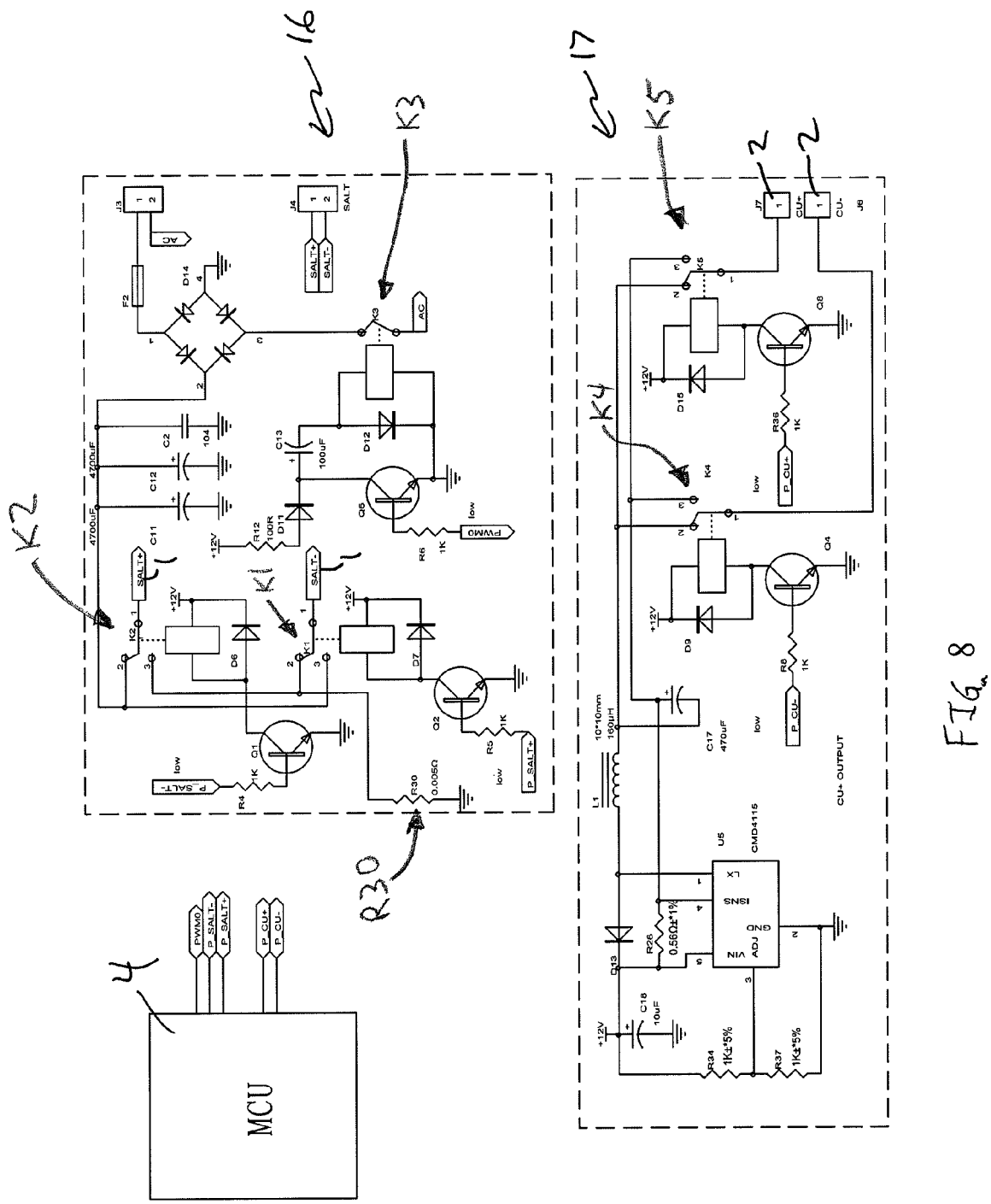
FIG. 8 is a circuit diagram when the titanium plate is supplied with electric power while the copper billet is not supplied with electric power.

With reference to FIG. 8, State 2 reflects the configuration when it is necessary to supply titanium plate 1 with electric power to generate chlorine ions. In this configuration, MCU 4 controls the closure of relay K3 using Pulse Width Modulation, while other relays remain unchanged in the OFF state. In this state, electric current flows into the positive electrode SALT+ of titanium plate 1 through the normally closed contact of relay K2 from relay K3, then is grounded after flowing past the normally closed contact of relay K1 from the negative electrode SALT− of titanium plate 1 and a resistor R30. Resistor R30 collects the electric current signals used for monitoring the electrolysis process of titanium plate 1. At this time, titanium plate 1 is in the mode of positive electrode electrolysis, relays K4, and K5 remain in the OFF state, and copper billet 2 is maintained in the grounded state. Maintaining copper billet 2 in a grounded state means the electric potentials of the positive and negative electrodes of copper billet 2 are the same as in State 1, rather than being affected by titanium plate 1 in its ON state. Accordingly, copper billet 2 will not release copper ions, and copper dissolution is avoided.

Figure 9:
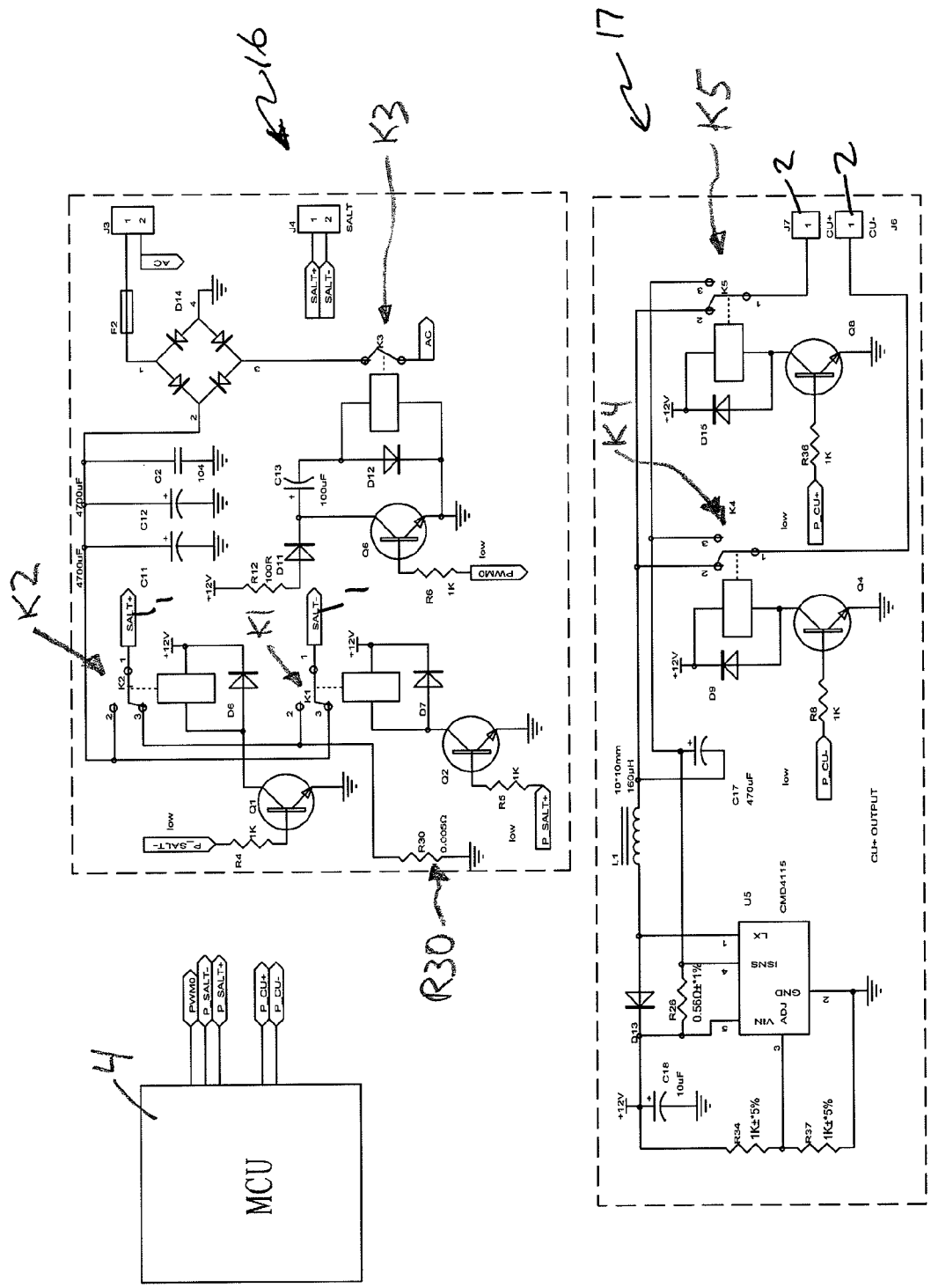
FIG. 9 is a circuit diagram when the titanium plate is reversely supplied with electric power while the copper billet is not supplied with electric power.

With further reference to FIG. 9 (State 3), to ensure the removal of scale on the surface of titanium plate 1, after an appropriate time interval, MCU 4 switches relays K1 and K2 to the ON state (both fixed ends are lap-jointed to the normally open contact) and the electric current flows into the negative electrode SALT− of titanium plate 1 through the normally open contact of relay K1. After passing titanium plate 1, the electric current then is grounded via the positive electrode SALT+ of titanium plate 1, the normally open contact of relay K2, and the resistor R30, so that titanium plate 1 is in the mode of reversed electrolysis. At this time, relays K4 and K5 are in the same state as in FIG. 8 (State 2), and copper billet 2 is out of operation.

Figure 10:
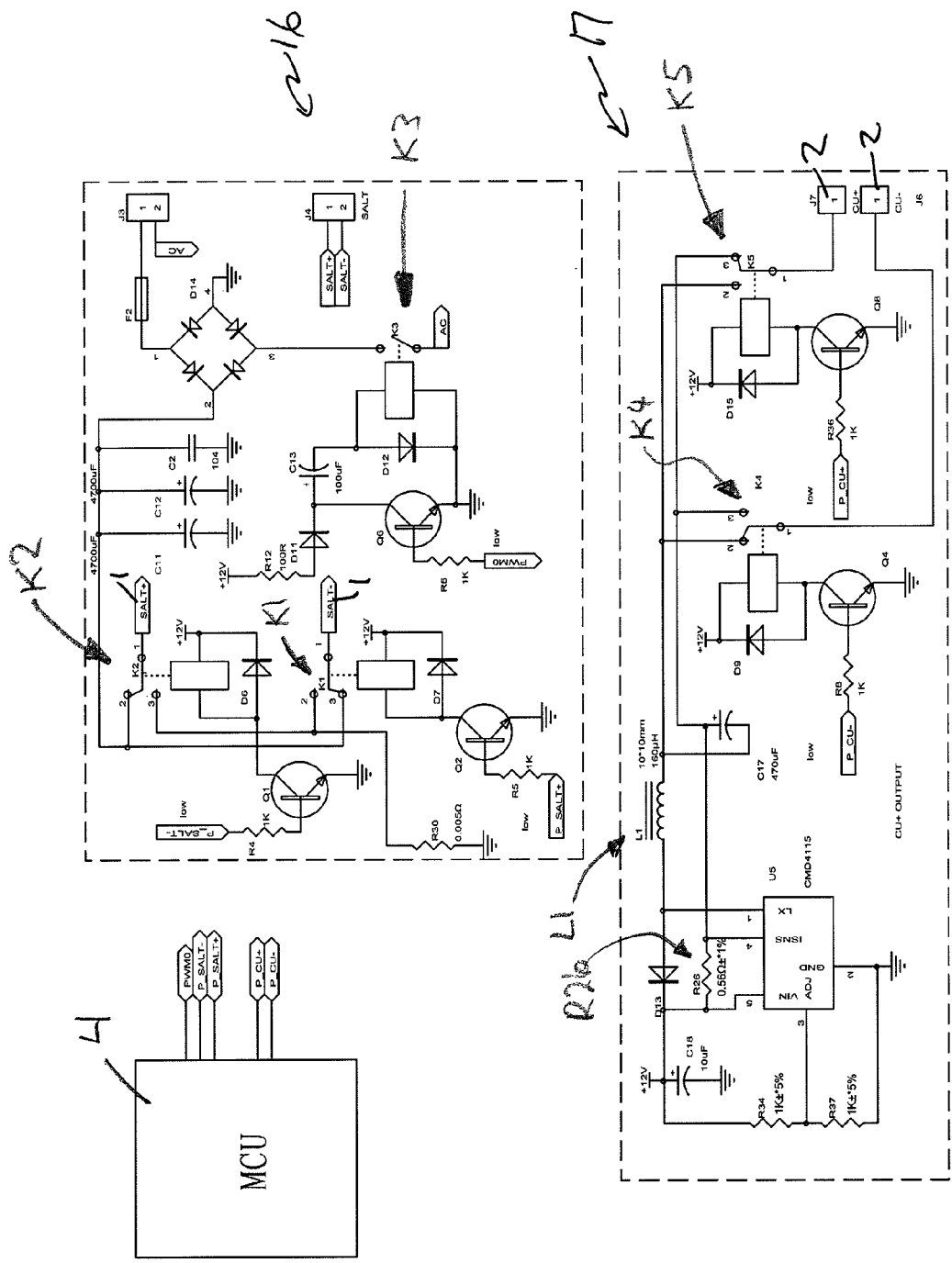
FIG. 10 is a circuit diagram when the titanium plate is not supplied with electric power while the copper billet is supplied with electric power.

FIG. 10 shows a circuit connecting diagram for State 4 wherein copper billet 2 is receiving electric current. In this embodiment, relays K2 and K3 are in the OFF state, while relay K1 is in the ON state, so no electric voltage is applied on the titanium plate 1, which is in the uncharged state. Relay K4 is in the OFF state, and relay K5 is in the ON state. The fixed end of K5 is lap-jointed to the normally open contact, so the constant-current source output by chip 15 reaches the positive electrode CU+ of copper billet 2 via relay K5. After flowing through copper billet 2, the constant-current source passes the negative electrode CU− of copper billet 2, the normally closed contact of the relay K4, inductance L1, and then reaches the LX end of chip 15. Specifically, with reference to FIG. 12, when VIN-VISNS<85 mV, the output of the CS comparator outputs a high electric level, and the MOS is turned on, while when VIN-VISNS>115 mV, the output of the CS comparator outputs a low electric level, and the MOS is turned off. By repeating such a process, the average electric current flowing through resistor R26 is (85+115)/(2*0.56) =179 mA, so that copper billet 2 is provided with a constant electric current for electrolysis.

Figure 11:
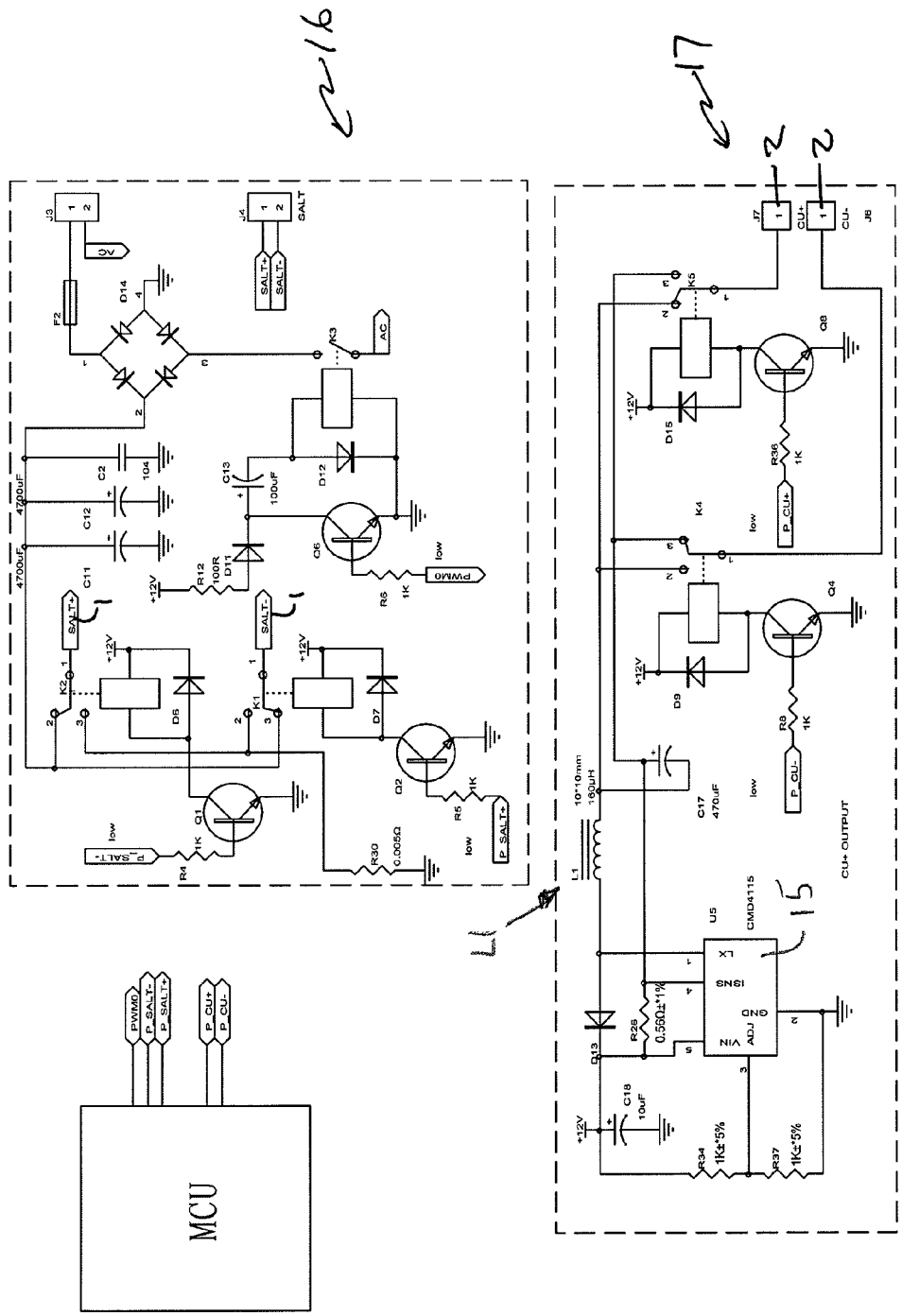
FIG. 11 is a circuit diagram when the titanium plate is not supplied with electric power while the copper billet is reversely supplied with electric power.

With further reference to FIG. 11 (State 5), to make uniform the degree of dissolution and corrosion of copper billet 2, it is necessary that the electric voltage applied on copper billet 2 is reversed after each time interval. In this embodiment, MCU 4 switches relay K4 to the ON state, while relay K5 is in the OFF state. Meanwhile the constant-current source output by chip 15 passes through the normally open contact of relay K4 to the negative electrode CU− of copper billet 2. Then from the positive electrode CU+ of copper billet 2, the constant-current source passes through normally closed contact of relay K5, the inductance L1, and the LX end.

Therefore, in operation of an exemplary embodiment of a two-in-one copper chloride disinfector of the present disclosure, titanium plate 1 and copper billet 2 run in a time-sharing manner, and during the operation of titanium plate 1, copper billet 2 is under cathodic protection. An exemplary working process is as follows: assuming that the customer sets the time consumed for the work of disinfection is n hours (n is a positive integer) per day, and copper billet 2 is assigned a working time coefficient of a, then the disinfector takes $n*(1-a)$ hours per day to generate chlorine, and takes $n*a$ hours per day to generate copper. During the period of $n*(1-a)$ hours for the generation of chlorine, the system is in State 2, during which if the time for reversing the titanium plate is encountered, then the state is changed to State 3 for reversing, until the reversing process lasts a designated time period, then changed back to State 2. This procedure is repeated until the working time of $n*(1-a)$ is met. During the period of $n*a$ hours for the generation of copper, the electric system is in State 4, which lasts 117 seconds, then State 1, which lasts 3 seconds, then the State 5, which lasts 117 seconds, then State 1, which lasts 3 seconds. This procedure is repeated until the working time of $n*a$ is met.

In addition, with reference to FIG. 4 and FIG. 6, MCU 4 is also connected with a circuit inputting on/off signal generated by the pool water flow switch 6 of the pool water flow detecting device 5. The current velocity switch 6 and the current velocity detecting device 5 are set at pipeline inlet 11 of the salt water pipeline 3. The pool water to be disinfected is detected to find whether it is at a low flow velocity, and if so, then the operation for the electrolysis of chlorine is interrupted so as to protect the titanium plate 1.

Furthermore, MCU 4 of the present embodiment may also be connected with a LED. With reference to FIG. 5, the code displayed by LED 18 and the corresponding definition thereof are shown in Table 1, with which the operator may easily grasp the current operating conditions.

TABLE 1

| LED Code | Definition |
| --- | --- |
| 80 | reinforced disinfection |
| 01 | the shortest running time (remaining 1 hours) |
| 02 | running time (remaining 2 hours) |
| 03 | running time (remaining 3 hours) |
| 04 | running time (remaining 4 hours) |
| 05 | running time (remaining 5 hours) |
| 06 | running time (remaining 6 hours) |
| 07 | running time (remaining 7 hours) |
| 08 | running time (remaining 8 hours) |
| 09 | running time (remaining 9 hours) |
| 10 | running time (remaining 10 hours) |
| 11 | running time (remaining 11 hours) |
| 12 | running time (remaining 12 hours) |
| 90 | alarm code (low water flow velocity/no water flow) |
| 91 | alarm code (low concentration of salt) |
| 92 | alarm code (ultrahigh concentration of salt) |
| 93 | halted state (end of running) |
| No display | electrical source is unplugged or in "resting state" ready for the next round of operation |

In addition, the titanium plate in the electrolysis bath of the above mentioned embodiment may be replaced with a graphite polar plate, and sodium bromide solution is used in salt water pipeline 3. When the graphite polar plate is supplied with electric power, the anode of the polar plate releases bromine disinfectant, and the other aspects are the same as the structures described in the above mentioned embodiment, which are not detailed herein for clarity.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A swimming pool disinfector, comprising
a pool water pipeline having an inlet and outlet through which pool water passes to create an electrolysis bath area;
a plurality of sanitizer electrodes including at least one positive electrode and at least one negative electrode positioned in the electrolysis bath area to create sanitizing halogens;
a plurality of copper electrodes including at least one positive electrode and at least one negative electrode positioned in the electrolysis bath to create copper ions;
a power source providing electrical current to the plurality of sanitizer electrodes and the plurality of copper electrodes; and
a controller controlling the flow of electrical current to the plurality of sanitizer electrodes and the plurality of copper electrodes; the controller providing periodically reversing electrical current to the sanitizer electrodes of electrodes while short-connecting the positive and negative electrodes of the copper electrodes.

2. The disinfector of claim 1, wherein the plurality of sanitizer electrodes includes a plurality of titanium plates.

3. The disinfector of claim 1 wherein the plurality of sanitizer electrodes includes a plurality of polar graphite plates.

4. The disinfector of claim 3 wherein the pool water in the electrolysis bath area includes an effective amount of sodium bromide.

5. The disinfector of claim 1 wherein the pool water in the pool water in the electrolysis bath area includes an effective amount of sodium chloride.

6. The disinfector of claim 1 wherein the distance between the sanitizer electrodes and the cooper electrodes is from 5 millimeters to 400 millimeters.

7. The disinfector of claim 6 wherein the distance from 5 millimeters to 200 millimeters.

8. The disinfector of claim 1, wherein the copper electrodes are pure copper.

9. The disinfector of claim 1, wherein the copper electrodes are copper-zinc alloy.

10. A method for controlling the release of copper ions from a disinfector having a plurality of sanitizer electrodes generating halogens and a plurality of copper electrodes generating cooper ions, comprising the steps of:
a) supplying electric current to the sanitizer electrodes in order to release halogens, and during the release of halogens:
(i) periodically reversing the electrical polarity of the sanitizer electrodes;
(ii) short-connecting the copper electrodes, and
(iii) creating an electrical potential in the cooper electrodes of less than or equal to the electrical potential of at least one negative electrode of the sanitizer electrodes;
b) supplying an electric current to the copper electrodes to release copper ions, and during the release of copper ions:
(i) periodically reversing the electrical polarity of the copper electrodes while the electrodes of the sanitizer electrodes are placed in a an uncharged state.

11. The method of claim 10, wherein step (a)(iii) creates an electrical potential in the copper electrodes is less than at least one of the negative electrodes of the sanitizer electrodes during the creating step.

12. The method of claim 10, wherein the sanitizer electrodes includes a plurality of titanium plates.

13. The method of claim 10, wherein the sanitizer electrodes includes a plurality of polar graphite plate.

14. The method of claim 13, wherein the polar graphite plate generates bromide.

15. The method of claim 10, wherein when the copper ions are released, the copper electrodes are supplied with a constant electric current.

16. The method of claim 10, wherein when the copper ions are released, the copper electrodes are supplied with a sawtooth wave or half sine wave current, and the required time of the quantity of electricity corresponding to the dissolution of a certain amount of copper electrode is calculated.

17. The method of claim 10 wherein the release of copper ions is controlled as a function of the total quantity of the absolute value of electricity supplied to the copper electrodes, with the absolute value calculated at equal time intervals.

18. The method of claim 10 wherein the release of copper ions is controlled as a function of the capacitive integration of the absolute value of the quantity of electricity flowing through the copper electrodes.

* * * * *

UNITED STATES PATENT AND TRADEMARK OFFICE
CERTIFICATE OF CORRECTION

PATENT NO. : 8,486,252 B2
APPLICATION NO. : 12/871636
DATED : July 16, 2013
INVENTOR(S) : Hua Hsiang Lin It is certified that error appears in the above-identified patent and that said Letters Patent is hereby corrected as shown below:

In the Claims

Claim 5, Column 9, Line 39, delete first occurrence of "the pool water in"

Claim 10, Column 10, Line 13, delete "cooper" and insert --copper--

Signed and Sealed this
Twelfth Day of November, 2013

Teresa Stanek Rea
*Deputy Director of the United States Patent and Trademark Office*